A. BARTHELS.
CONDUIT BOX ROSETTE FOR ELECTRIC WIRING.
APPLICATION FILED OCT. 8, 1915.

1,191,649.

Patented July 18, 1916.

WITNESSES

INVENTOR
Arthur Barthels
BY
ATTORNEYS

UNITED STATES PATENT OFFICE.

ARTHUR BARTHELS, OF SAN FRANCISCO, CALIFORNIA.

CONDUIT-BOX ROSETTE FOR ELECTRIC WIRING.

1,191,649.      Specification of Letters Patent.      Patented July 18, 1916.

Application filed October 8, 1915. Serial No. 54,764.

*To all whom it may concern:*

Be it known that I, ARTHUR BARTHELS, a citizen of the United States, and a resident of San Francisco, in the county of San Francisco and State of California, have invented a new and Improved Conduit-Box Rosette for Electric Wiring, of which the following is a full, clear, and exact description.

This invention relates to rosettes for conduit boxes, and it has for its general objects to improve and simplify the construction of devices of this character so as to be reliable and efficient in use, comparatively inexpensive to manufacture and possessing the advantages that it can be used with standard receptacle covers, thereby obviating the necessity of several sizes for different sized boxes; that breakage is reduced to a minimum, due to the small compact form; that mechanical strength is secured, because strains come on the cover instead of on the weakest part of the rosette, as in other makes, namely the screw holes, and that wires can be connected with less trouble, as the cover can be attached after the wires are connected, and liability to damage after installation is reduced to a minimum, because of the comparatively small surface of the rosette exposed.

The invention comprises a rosette having a reduced portion which projects through an opening in the conduit box cover and in the reduced portion is a circumferential groove into which is fastened a split locking ring that engages the outer face of the cover while the annular flange formed on the internal portion of the rosette engages the rear or inner face of the cover so as to hold the rosette securely on the cover, there being a key on the rosette which engages in a slot in the cover so as to prevent turning of the rosette.

With such objects in view, and others which will appear as the description proceeds, the invention comprises various novel features of construction and arrangement of parts which will be set forth with particularity in the following description and claim appended hereto.

Figure 1:
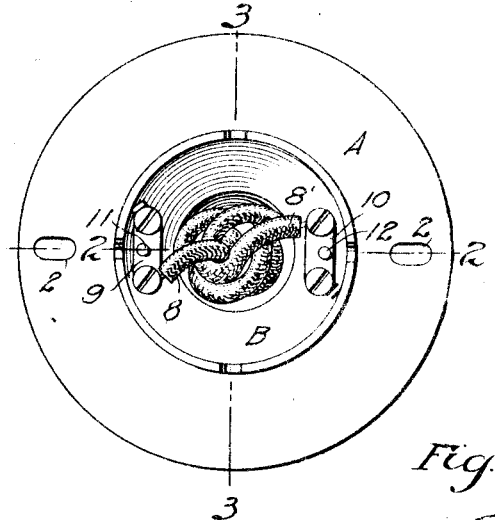
Figure 4:
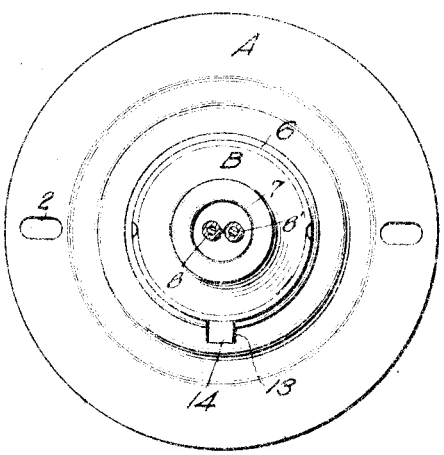
Figure 6:
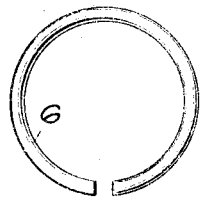
Figure 2:
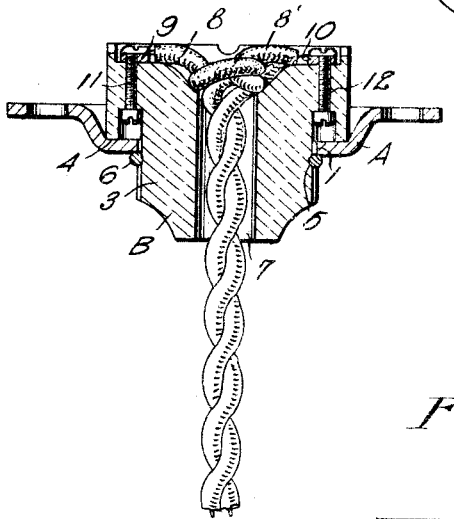
Figure 3:
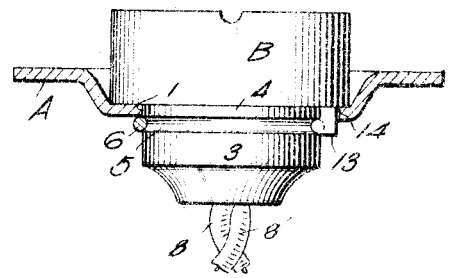
Figure 5:
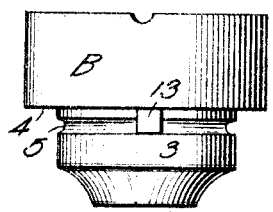

In the accompanying drawing, which illustrates one embodiment of the invention and wherein similar characters of reference indicate corresponding parts in all the views, Figure 1 is an inner face view of the conduit box cover; Fig. 2 is a sectional view on the line 2—2, Fig. 1; Fig. 3 is a sectional view on the line 3—3, Fig. 1; Fig. 4 is a view of the outside of the cover and rosette; Fig. 5 is a side view of the rosette; and Fig. 6 is a view of the locking ring.

Referring to the drawing, A designates the cover of a conduit box, which cover has an opening 1 for receiving the rosette B, and has slots 2 for the screws or fasteners that secure the cover to the box. The rosette B comprises a body of porcelain or other insulating material, which body may be cylindrical and formed with a reduced portion 3, which extends through the opening 1 of the cover. By reducing the projecting portion of the rosette the base portion is formed with an annular shoulder 4 which engages the inner face of the cover and prevents the rosette from passing through the opening 1. The reduced portion 3 has an annular groove or seat 5 which is spaced from the shoulder 4 a distance equal to the thickness of the metal of which the cover A is made. In this seat is engaged a split ring 6 which locks the rosette on the cover. This split ring can be readily removed by a suitable instrument, a  then the rosette can be detached from t e cover. The rosette has the usual bore 7 or the wires 8 and 8' which are connected respectively with the terminal pieces 9 and 10 fastened in the usual manner by screws 11 and 12. To prevent the rosette from turning, the same is formed with a key 13 which engages in a key slot 14 formed in the edge of the opening 1 of the cover. By arranging the rosette directly on the cover the various advantages hereinbefore mentioned are obtained.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

The combination of a support having a circular opening provided with a slot in the edge of the opening, a rosette having a reduced portion projecting through the opening, and a shoulder bearing against the support, there being an annular groove around the reduced portion adjacent the side of the support opposite the side engaged by the said shoulder, a lug on the rosette engaging in the slot of the support, whereby the rosette is prevented from turning, and a split ring surrounding the reduced portion of the rosette and engaged in the groove to reta the rosette on the support, the slit of th ring accommodating the said lug.

In testimony whereof I have signed my name to this specification in the presence c two subscribing witnesses.

ARTHUR BARTHELS.

Witnesses:
  HORACE HIRSCHLER,
  CHAS. F. DINSENBERG.